United States Patent
Tsubakimoto et al.

(10) Patent No.: US 9,456,095 B2
(45) Date of Patent: Sep. 27, 2016

(54) PART ENGAGING STRUCTURE AND APPARATUS HAVING THE SAME

(71) Applicant: CANON KABUSHIKI KAISHA, Tokyo (JP)

(72) Inventors: Yasuhito Tsubakimoto, Tokyo (JP); Toshiaki Harada, Kawasaki (JP); Kazuhisa Kawakami, Yokohama (JP); Tadashi Hanabusa, Yokohama (JP); Kaneto Tokuyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 14/331,649

(22) Filed: Jul. 15, 2014

(65) Prior Publication Data
US 2015/0022958 A1 Jan. 22, 2015

(30) Foreign Application Priority Data
Jul. 19, 2013 (WO) .................. PCT/JP2013/069575

(51) Int. Cl.
| | | |
|---|---|---|
| *H05K 5/02* | (2006.01) | |
| *H04N 1/00* | (2006.01) | |
| *F16B 3/00* | (2006.01) | |
| *F16B 5/06* | (2006.01) | |

(52) U.S. Cl.
CPC ............. *H04N 1/00496* (2013.01); *F16B 3/00* (2013.01); *F16B 5/0664* (2013.01); *H04N 1/00557* (2013.01); *Y10T 403/7035* (2015.01)

(58) Field of Classification Search
None
See application file for complete search history.

(56) References Cited

U.S. PATENT DOCUMENTS

| | | | | | |
|---|---|---|---|---|---|
| 4,692,571 | A | * | 9/1987 | Trinh | ..................... H01H 13/70 200/307 |
| 5,373,104 | A | * | 12/1994 | Brauer | ................. H05K 7/1417 174/562 |
| 5,418,693 | A | * | 5/1995 | Perry | .................. H05K 9/0067 361/748 |
| 5,613,237 | A | * | 3/1997 | Bent | ..................... H04B 1/086 220/4.02 |
| 5,703,625 | A | * | 12/1997 | Snider | ................... B60Q 3/004 345/102 |
| 5,946,395 | A | * | 8/1999 | Petrella | ............... H04M 1/0249 379/433.01 |
| 5,960,332 | A | * | 9/1999 | Michalzik | ........... H04M 1/0249 455/575.1 |
| 6,169,256 | B1 | * | 1/2001 | Hanahara | ........... H01H 13/7006 200/296 |

(Continued)

FOREIGN PATENT DOCUMENTS

| | | |
|---|---|---|
| JP | H03-17310 U | 2/1991 |
| JP | H09-322358 A | 12/1997 |

(Continued)

*Primary Examiner* — Xanthia C Cunningham
(74) *Attorney, Agent, or Firm* — Canon USA, Inc., IP Division (57) ABSTRACT

A part engaging structure having sufficient intensity while reducing the use amount of material, and having high positioning accuracy is provided. An engaging structure allows a protruding portion formed at a first part to be received by a receiving portion formed at a second part and engages the first part with the second part. The protruding portion is formed of a structure body having a plurality of ribs combined in a polygonal shape lacking part of sides, and at least two of corner portions of the polygon of the structure body contact an inner surface of the receiving portion.

11 Claims, 10 Drawing Sheets

(56) References Cited

U.S. PATENT DOCUMENTS

| | | | | | |
|---|---|---|---|---|---|
| 6,275,387 | B1* | 8/2001 | Liao | | G06F 1/181 361/806 |
| 6,315,142 | B1* | 11/2001 | Kitamura | | H04M 1/0252 220/324 |
| 6,375,283 | B1* | 4/2002 | Kitamura | | H04B 1/3833 292/81 |
| 6,808,239 | B1* | 10/2004 | Bader | | H04M 1/0252 292/19 |
| 6,876,543 | B2* | 4/2005 | Mockridge | | H04M 1/0249 361/752 |
| 7,429,700 | B2* | 9/2008 | Kanamaru | | H01R 13/6271 174/135 |
| 7,554,047 | B2* | 6/2009 | Verdu | | H01H 13/023 200/314 |
| 7,724,540 | B1 | 5/2010 | Salinas Fox | | H05K 7/142 174/138 G |
| 7,964,808 | B2* | 6/2011 | Seo | | G06F 3/0338 200/296 |
| 8,020,901 | B2* | 9/2011 | Watanabe | | B41J 29/00 292/80 |
| 8,148,633 | B2* | 4/2012 | Hung | | G06F 1/1626 174/50 |
| 8,164,898 | B2* | 4/2012 | Chen | | H04M 1/0249 361/679.55 |
| 8,199,526 | B2* | 6/2012 | Yu | | G06F 1/181 312/215 |
| 8,480,186 | B2* | 7/2013 | Wang | | H05K 5/0013 312/223.1 |
| 8,558,125 | B2* | 10/2013 | Kano | | G03G 15/5016 200/345 |
| 8,693,201 | B2* | 4/2014 | Yamazaki | | H01H 13/705 200/341 |
| 2004/0140190 | A1* | 7/2004 | Searle | | H01H 3/122 200/341 |
| 2007/0227864 | A1* | 10/2007 | Tsai | | G06F 1/181 200/293 |
| 2011/0242571 | A1* | 10/2011 | Ogushi | | H03K 17/9622 358/1.13 |

FOREIGN PATENT DOCUMENTS

| | | |
|---|---|---|
| JP | 2002-17025 A | 1/2002 |
| JP | 2002-166801 A | 6/2002 |

* cited by examiner

PART ENGAGING STRUCTURE AND APPARATUS HAVING THE SAME

TECHNICAL FIELD

The present invention relates to an engaging structure that engages and couples a plurality of parts.

BACKGROUND ART

As a structure of positioning and engaging two parts, there is known a structure in which one part has a shaft, the other part has a hole, and the shaft is fitted to the hole. For example, referring to PTL 1, an edge portion of a lower cover has a plurality of pin-like positioning shapes, and an edge portion of a case has a plurality of recessed or protruding positioning shapes. In PTL 1, the edge portions of the case and the lower cover are positioned by fitting the pin-like positioning shapes to the recessed or protruding positioning shapes.

CITATION LIST

Patent Literature

PTL 1 Japanese Patent Laid-Open No. 2002-17025

However, with the example in PTL 1, since the positioning shapes are each a solid columnar pin, when a force is applied to the positioning shapes, the positioning shapes can support the load equally in all directions; however, the positioning shape portions require a large amount of material.

The present invention is made to address such a problem, and an object of the invention is to provide an engaging structure having sufficient intensity while reducing the use amount of material, and having high positioning accuracy.

SUMMARY OF INVENTION

To address the above-described problem, an engaging structure allows a protruding portion formed at a first part to be received by a receiving portion formed at a second part and engages the first part with the second part. The protruding portion is formed of a structure body having a plurality of ribs combined in a polygonal shape lacking part of sides, and at least two of corner portions of the polygon of the structure body contact an inner surface of the receiving portion.

Further features of the present invention will become apparent from the following description of exemplary embodiments with reference to the attached drawings.

DESCRIPTION OF EMBODIMENTS

First Embodiment

A first embodiment of the invention is specifically described below with reference to the drawings. It is to be noted that the same reference sign indicates the same or corresponding portion throughout the drawings. Also, a reference sign numbered with an alphabet represents a subordinate portion of a portion numbered without an alphabet.

Figure 1:
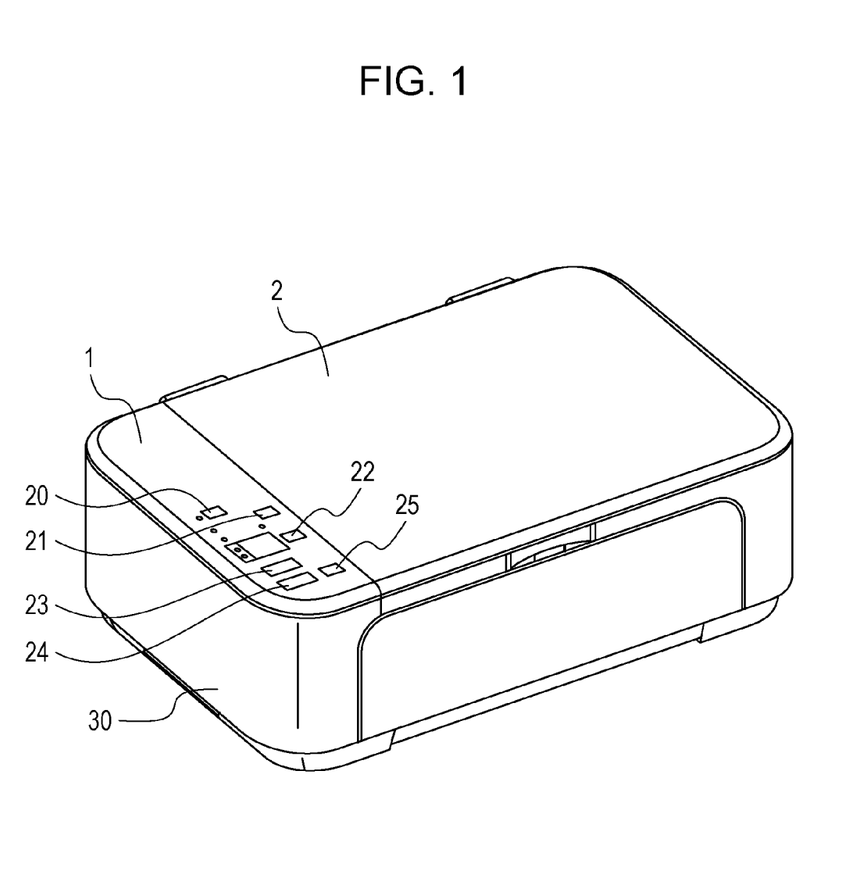
FIG. 1 is a view showing a first embodiment of the invention, and is a perspective view showing the positional relationship between a first member and a second member in an entire apparatus, the apparatus including an operation panel serving as the first member and having a protruding portion for positioning, and a panel frame serving as a second member and having a protrusion to which the protruding portion is fitted.

FIG. 1 is a perspective view of an entire apparatus according to an embodiment of the invention. The apparatus has an engaging structure including a first part and a second part and engaging the first part with the second part, the structure being also a positioning structure positioning the first part and the second part. As an example of the apparatus, a multifunction printer is used. The multifunction printer is a processing apparatus that executes printing and reading processing of an image.

The apparatus includes an operation panel with which a user performs various operations. Reference sign 1 denotes a panel cover forming part of an outer surface of the processing apparatus. A flatbed scanner is arranged next to the panel cover 1. An openable/closable document pressing plate 2 is arranged next the panel cover 1. Also, reference signs 20 to 25 denote movable operation keys provided at an operation unit, and 30 denotes an outer cover. The panel cover 1 has holes for the operation keys 20 to 25 which are movable members. To prevent the keys from being stuck (galling) because the positions of the holes provided at the panel cover 1 for the operation keys are shifted, or to prevent the document pressing plate 2 from unintentionally contacting the panel cover 1, the panel cover 1 is required to be accurately positioned.

Figure 2A:
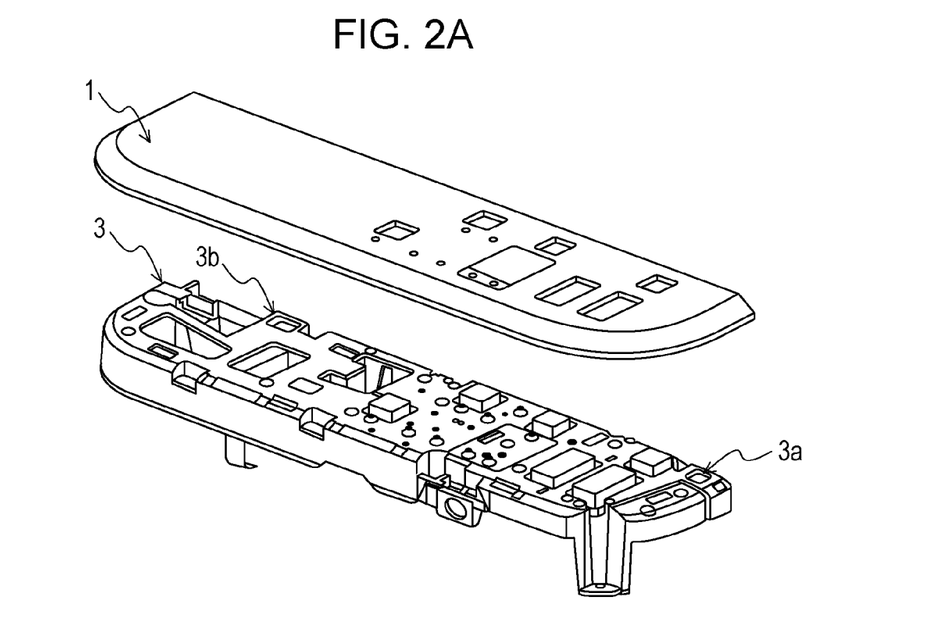
FIGS. 2A and 2B are views showing the first embodiment of the invention, and are exploded perspective views for describing the operation panel serving as the first member shown in FIG. 1.
Figure 2B:
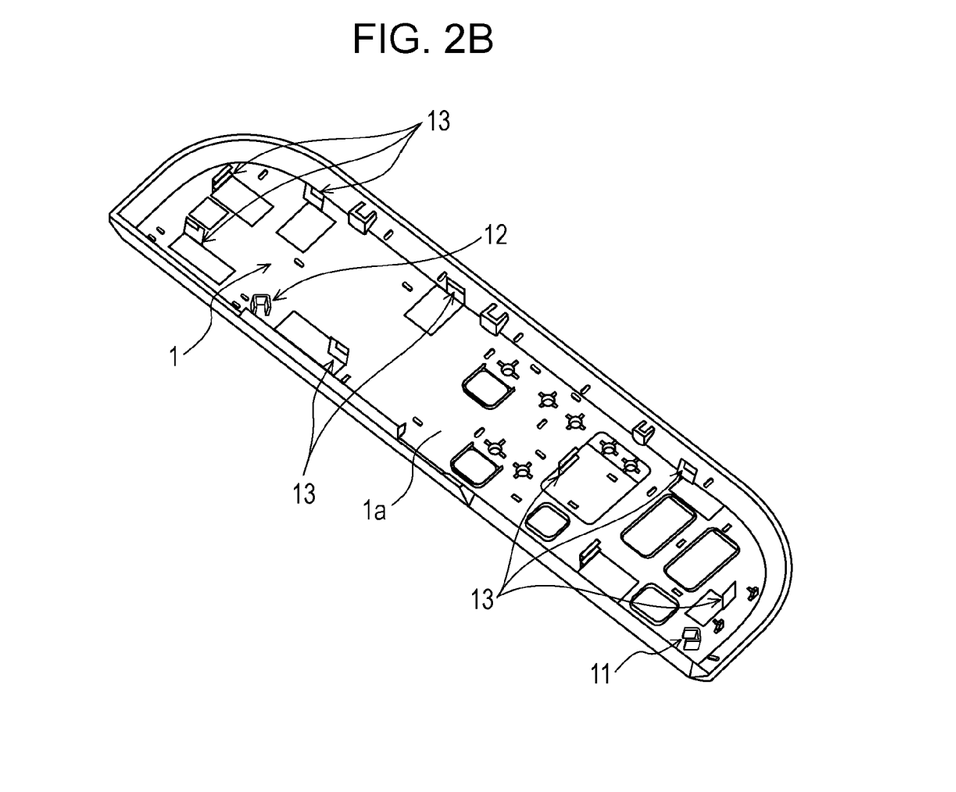
Figure 3A:
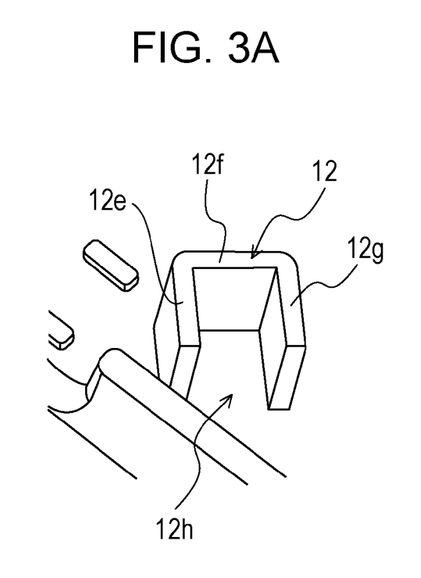
FIGS. 3A and 3B are views showing the first embodiment of the invention, and are views for describing the details of protruding portions for positioning provided at the operation panel.
Figure 3B:
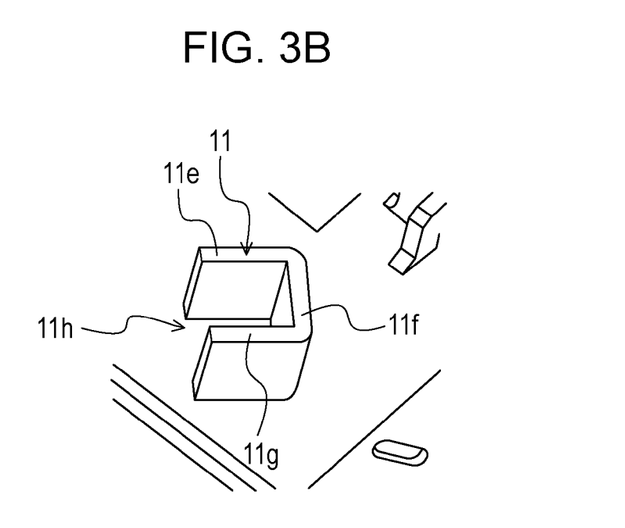

FIG. 2A is an exploded perspective view for describing the panel cover 1 and the inside thereof in the apparatus in FIG. 1. In FIG. 2A, reference sign 3 denotes a panel frame provided separately from the document pressing plate 2. The panel cover 1 serving as the second part is mounted on the panel frame 3. Reference signs 3a and 3b are positioning holes provided at the panel frame 3, for positioning the panel cover 1. FIG. 2B is a view for describing the back side of the panel cover 1 in FIG. 2A. In FIG. 2B, reference signs 11 and 12 are protruding portions for positioning the panel cover 1. The protruding portions 11 and 12 are formed at two positions. The protruding portions 11 and 12 have flexible claw shapes. FIGS. 3A and 3B are detailed views of the protruding portions for positioning described with reference to FIG. 2B.

The protruding portion 12 has a shape having three sides formed by wall-shaped wall portions (ribs) 12e, 12f, and 12g protruding from a back surface 1a of the panel cover 1, while the remaining one side 12h being open. The protruding portion 11 also has a similar shape having three sides formed by wall-shaped wall portions 11e, 11f, and 11g protruding on the surface at the back side of the panel cover 1, while the remaining one side 11h is open. When the protruding portions 11 and 12 are fitted to the positioning holes 3a and 3b formed at the panel frame 3, the panel cover 1 is positioned in a planar direction.

When the panel cover 1 is assembled with the panel frame 3, the position of the panel cover 1 is accurately determined by the protruding portions 11 and 12 for positioning and the positioning holes 3a and 3b described with reference to FIGS. 2A, 2B, 3A, and 3B. Also, claw shapes 13 are engaged with the panel frame 3, and hence the position of the panel cover 1 is completely restrained.

Figures 4A, 4B, 4C:
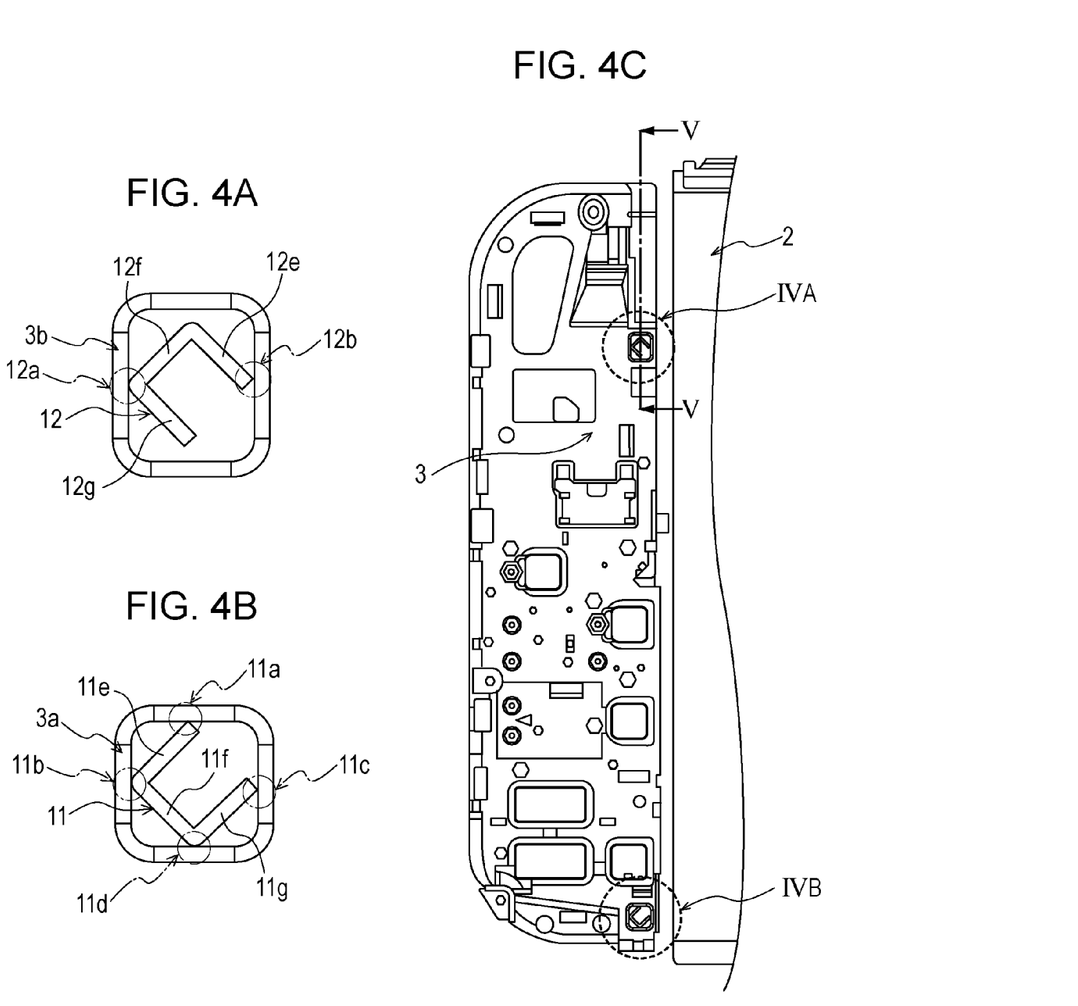
FIGS. 4A to 4C are views showing the first embodiment of the invention, and are detailed views for describing the positional relationship between the protruding portions for positioning provided at the operation panel and the panel frame serving as the second member and having protrusions to which the protruding portions are fitted, and also describing the details of the protruding portions for positioning provided at the operation panel.

FIGS. 4A to 4C are views for describing the positional relationship between the protruding portions for positioning provided at the panel cover 1 and the panel frame 3, and the detailed structures of the protruding portions for positioning provided at the panel cover 1. In FIGS. 4A to 4C, a body part of the panel cover 1 is omitted, and only the protruding portions 11 and 12 integrally formed at the panel cover 1 and the positioning holes 3a and 3b formed at the panel frame 3 are illustrated for convenience of description. In this drawing, reference signs 11a, 11b, 11c, and 11d are positioning portions (corner portions) of the protruding portion 11, the positioning portions which contact receiving portions of an inner wall surface of the positioning hole 3a for positioning. The protruding portion 11 for positioning has a structure body formed by combining a plurality of ribs in a polygonal shape (quadrangular shape in this embodiment). That is, the mutually connected wall-shaped wall portions (ribs) 11e, 11f, and 11g are provided at positions corresponding to three sides of the quadrangle on the operation panel back surface 1a. Among the sides of the quadrangle, a side without the rib is provided at a side to face the document pressing plate 2 and the protruding portion 12 for positioning. The positioning portions are formed at four corner portions of the polygonal shape. A plurality of wall portions are continuously formed at each of the positioning portions 11b and 11d. The wall portions 11e and 11f are continuously formed at the positioning portion 11b, and the wall portions 11f and 11g are continuously formed at the positioning portion 11d.

Reference signs 12a and 12b of the other protruding portion 12 are two corner portions of a polygon, which are positioning portions that contact receiving portions of an inner peripheral surface of the positioning hole 3b for positioning. The protruding portion 12 for positioning has the mutually connected wall-shaped wall portions 12e, 12f, and 12g at positions corresponding to three sides of the quadrangle. The remaining side is not formed with the wall portion. The wall portions 12f and 12g are formed continuously at the positioning portion 12a. Among the sides of the quadrangle, a side without the wall-shaped portion is provided at a side to face the document pressing plate 2 and the protruding portion 11 for positioning. A gap with a length k1 is formed between the protruding portion 12 and an inner wall 3d at the operation-panel rear-end side of the positioning hole 3b.

Figure 5:
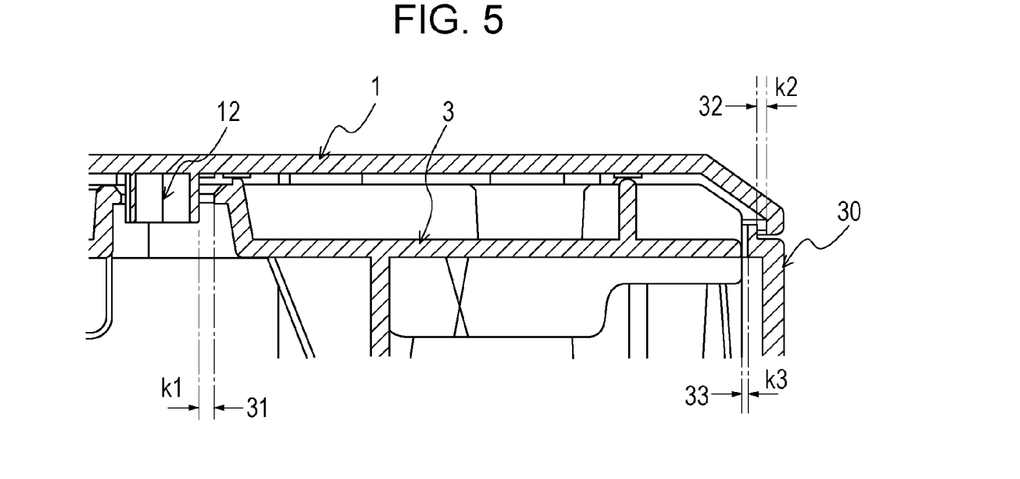
FIG. 5 is a view showing the first embodiment of the invention, and is a sectional view taken along line V-V in FIG. 4C of an area near the protruding portion 12 for positioning.

FIG. 5 is a sectional view taken along line V-V in FIG. 4C. In this drawing, reference sign 31 denotes a gap between the protruding portion 12 for positioning and the panel frame 3, 32 denotes a gap between the panel cover 1 and the outer cover 30, and 33 denotes a gap between the outer cover 30 and the panel frame 3. When the lengths of the gaps 31, 32, and 33 are k1, k2, and k3, respectively, a relationship k1≥k2+k3 is established.

Figure 6:
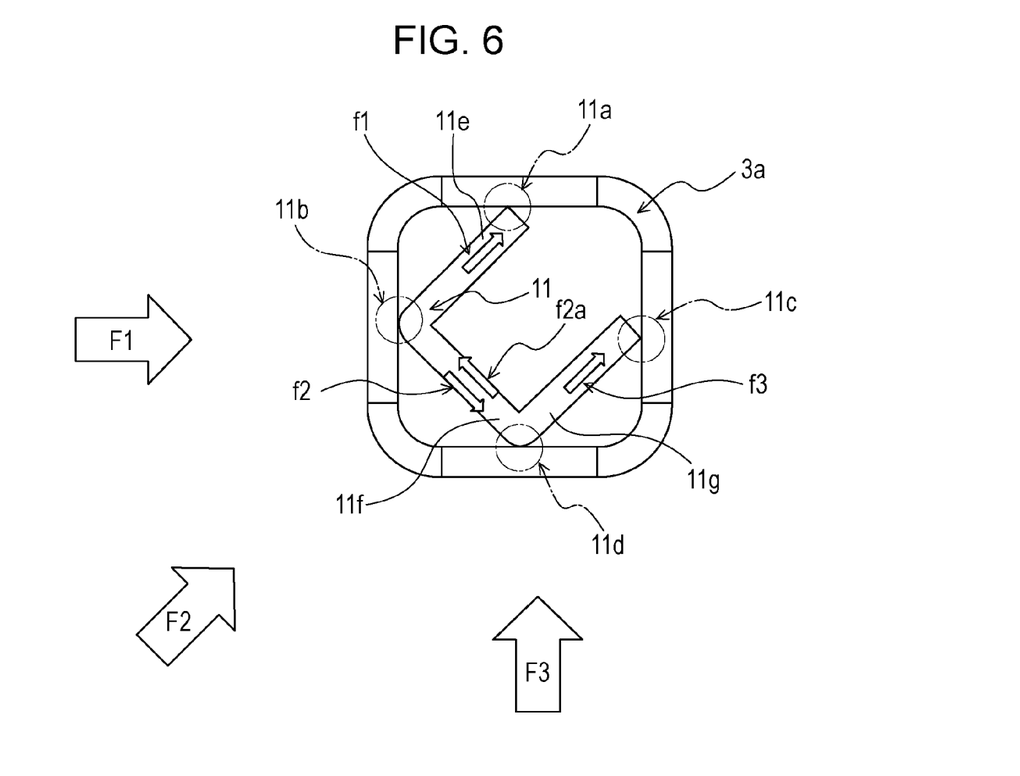
FIG. 6 is a view showing the first embodiment of the invention, and is a view for describing loads applied to the protruding portion 11 for positioning and transmission paths of the loads.

FIG. 6 shows forces applied to the protruding portion 11 when a force is applied such that the panel frame 3 is relatively shifted from the panel cover 1 in a direction parallel to the operation-panel front surface. Such a phenomenon may occur, for example, when the apparatus packed during distribution falls from the left side of the apparatus shown in FIG. 1. When the packed apparatus hits the ground, since the panel frame 3 is fixed to the apparatus body with a large inertia, the panel frame 3 is bounced while the packing material is deformed. The panel cover 1 is sunk in the packing material because the panel cover 1 has a small side-edge surface area, and the panel cover 1 moves to be shifted to the lower side relative to the panel frame 3. At this time, a force F1 in FIG. 6 is applied to the protruding portion 11 of the panel cover 1 from the inner peripheral surface of the positioning hole 3a of the panel frame 3.

As shown in FIG. 6, if the force F1 is applied to the protruding portion 11 from the inner peripheral surface of the positioning hole 3a, the force F1 is distributed into component forces f1 and f2 in directions in which the wall portions (ribs) 11e and 11f extend. The directions of the component forces are directions in which the wall portions 11e and 11f strongly resist a bending force or a shearing force. Similarly, even if a force F3 is applied to the protruding portion 11 for positioning, the force F3 is distributed into component forces f2a and f3 along the wall portions 11f and 11g. If a force F2 is applied in an intermediate direction between the directions of the forces F1 and F3, the force F2 is received by the two positioning portions 11b and 11d, and is distributed into the component forces f1 and f3 respectively along the wall portions 11e and 11g. In this way, there is provided a structure in which a force received by a positioning portion is received by a plurality of wall portions in a distributed manner. In contrast, if a force is applied in a direction opposite to the force F1, the load is received by a tip portion (positioning portion 11c) of the wall-shaped portion 11g, and the force is not received by a plurality of wall-shaped portions in a distributed manner. However, since the document pressing plate 2 is normally provided, a large force is hardly applied in the direction opposite to F1. As described above, a large force hardly acts in a direction, in which a part formed with such a protruding portion is not exposed to the outside of the apparatus, even if a wall portion is not provided in that direction, this does not seriously affect the intensity.

Figure 7:
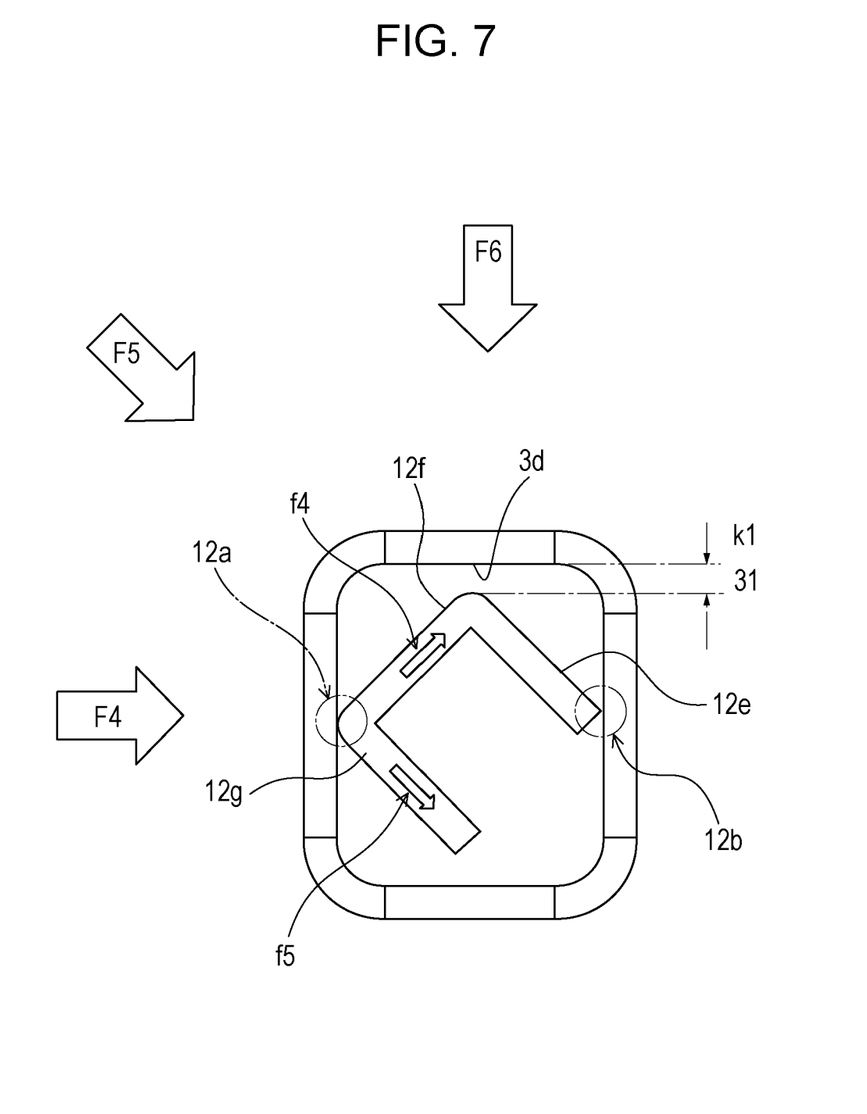
FIG. 7 is a view showing the first embodiment of the invention, and is a view for describing loads applied to the protruding portion 12 for positioning and transmission paths of the loads.

Also, FIG. 7 shows transmission paths of forces when the forces are applied to the protruding portion 12 for positioning. Similarly to FIG. 6, if a force F4 is applied to the protruding portion 12 for positioning, the load received by the positioning portion 12a is distributed into component forces f4 and f5 in directions respectively along the wall portions 12f and 12g. Also, as shown in FIG. 5, since the outer cover 30 is provided as a contact part between the panel cover 1 and the panel frame 3, the relationship among the gap amounts described in FIG. 5 is k1≥k2+k3. Hence, even if external forces are received in directions of F5 and F6, the forces are not applied to the protruding portion 12 for positioning.

As described above with reference to FIGS. 4A to 4C, the protruding portions 11 and 12 for positioning are each the ribs which are vertically arranged at the positions corresponding to the three sides of the quadrangle, and the end portions of which are mutually connected. With such a configuration, each protruding portion can be formed of a small amount of material while maintaining the intensity in a direction in which a large force is applied with a high possibility.

Also, when the panel cover 1 is manufactured with a resin material by injection molding, since the one side of the quadrangle is not formed with the rib, the heat of the mold in the quadrangle region can be radiated not only to the external surface and the opposite side, but also the side of the quadrangle without the rib.

Accordingly, breakage of the protruding portion for positioning can be avoided because stress concentration on the protruding portion for positioning is avoided, heat storage of the mold of the protruding portion for positioning can be avoided when the operation panel is manufactured with a resin material by injection molding, and defective external appearance can be avoided.

In this embodiment, the multifunction printer is used as an example of the apparatus. However, the apparatus to which the present invention is applicable is not limited to the multifunction printer. It is obvious that a similar advantage is obtained if similar shapes are used for a first member having a protruding portion for positioning, and a second member having a hole or a recess to which the protruding portion is fitted, or a second protruding portion which engages with the protruding portion. Also, in this embodiment, the document pressing plate 2 is arranged next to the panel cover 1 serving as the first member, and the panel frame 3 is used as an example of the second member. However, it is not limited thereto. The panel frame may also serve as a shape arranged next to the operation panel.

Also, in this embodiment, the thickness of the positioning rib is 70% or less of a basic thickness. However, if the exterior is hidden by another cover or the external appearance quality can be ignored, the intensity can be further increased as long as the thickness of the positioning rib is 70% or more of the basic thickness.

Second Embodiment

FIGS. 8A to 11 are schematic views for describing a second embodiment of the invention. The same reference signs as those in FIGS. 1 to 7 of the first embodiment are used. In this embodiment, a multifunction printer like the first embodiment is used as an example of the apparatus.

Figure 8A:
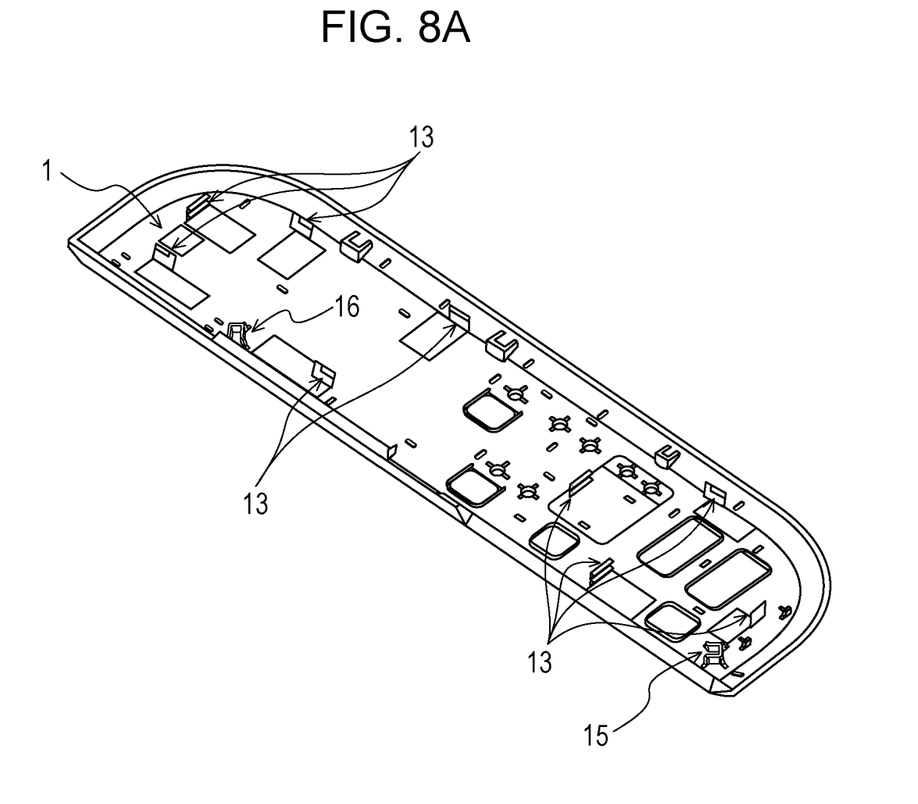
FIGS. 8A and 8B are views showing a second embodiment of the invention, and are views for describing an arrangement of protruding portions 15 and 16 for positioning provided at the operation panel, and orientations of shapes.
Figure 8B:
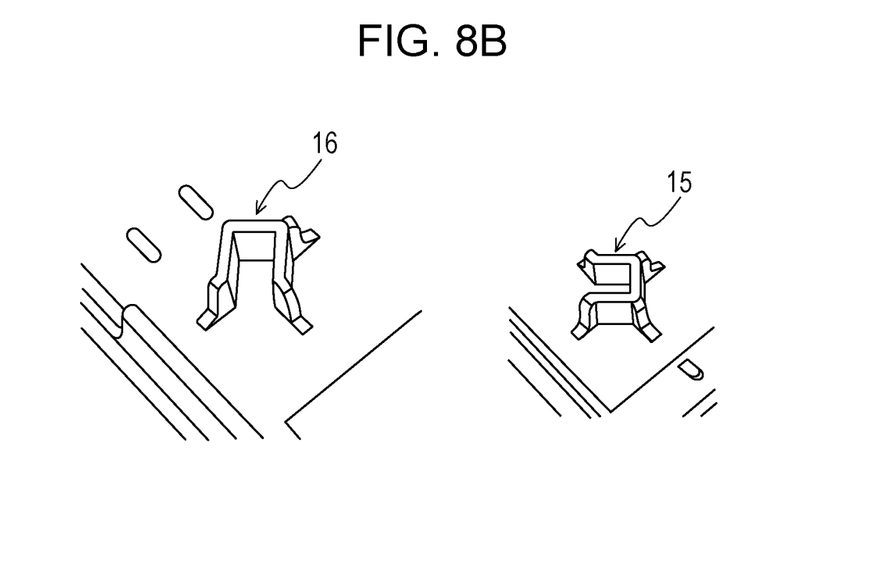

FIG. 8A is an exploded perspective view for describing other forms of the protruding portion 11 for positioning and the protruding portion 12 for positioning provided at the panel cover 1 described in the first embodiment. In FIG. 8A, reference sign 15 denotes a third protruding portion of other form instead of the protruding portion 11 for positioning described with reference to FIG. 2B. Also, reference sign 16 denotes a fourth protruding portion of other form instead of the protruding portion 12 for positioning described with reference to FIG. 2B.

Figure 9A:
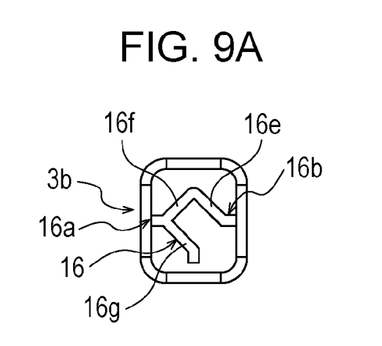
FIGS. 9A to 9C are views showing the second embodiment of the invention, and are views for describing the arrangement of the protruding portions 15 and 16 for positioning provided at the operation panel, and the orientations of the shapes.
Figure 9B:
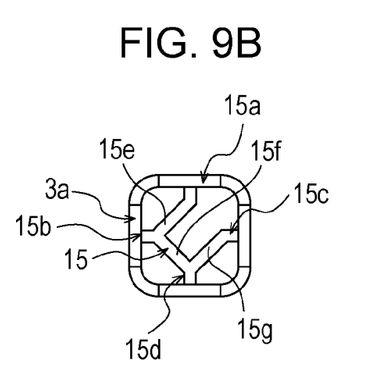
Figure 9C:
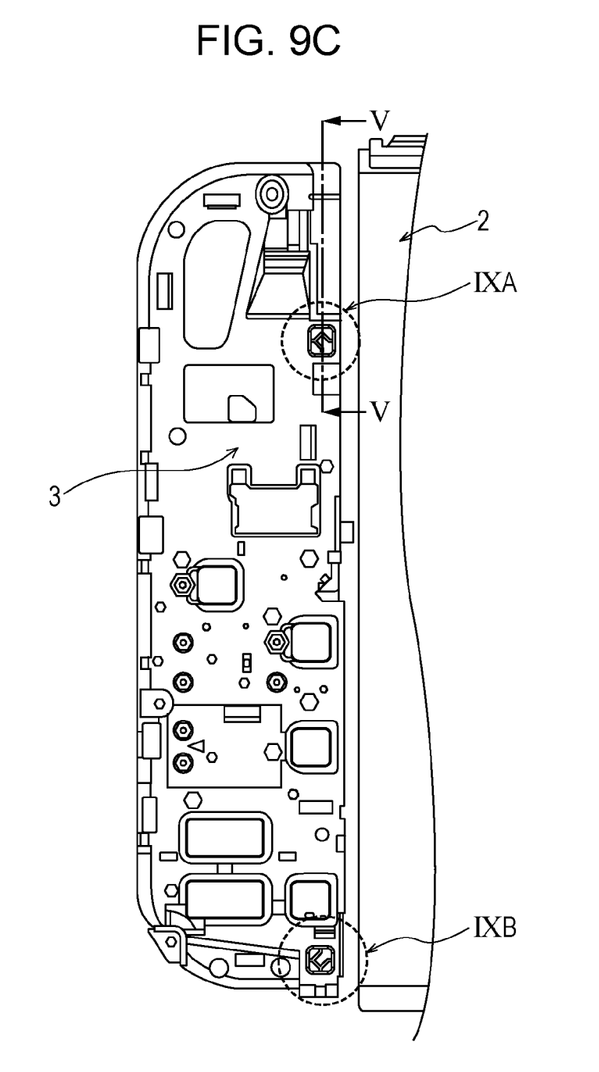

FIGS. 9A to 9C are detailed views for describing the positional relationship between the protruding portions for positioning provided at the panel cover 1 and the panel frame 3, and the details of the protruding portions for positioning provided at the panel cover 1. In FIGS. 9A to 9C, a body part of the panel cover 1 is omitted, and only the protruding portions 15 and 16 for positioning integrally formed with the body part of the panel cover 1 are illustrated for convenience of description. In this drawing, reference signs 15a, 15b, 15c, and 15d are small protrusions provided at the protruding portion 15 for positioning. The small protrusions 15a, 15b, 15c, and 15d contact the inner peripheral surface of the positioning hole 3a provided at the panel frame 3. Also, the protruding portion 15 for positioning has a shape in which wall portions (ribs) 15e, 15f, and 15g vertically arranged at positions corresponding to three sides of a quadrangle are connected. Among the sides of the quadrangle, a side without the wall portion faces the document pressing plate 2 and the protruding portion 16 for positioning. Reference signs 16a and 16b are small protrusions provided at the protruding portion 16 for positioning. The small protrusions 16a and 16b contact the positioning hole 3b provided at the panel frame 3. Also, the protruding portion 16 for positioning has a shape in which wall portions 16e, 16f, and 16g vertically arranged at positions corresponding to three sides of a quadrangle are connected. Among the sides of the quadrangle, a side without the wall portion faces the document pressing plate 2 and the protruding portion 15 for positioning.

Figure 10:
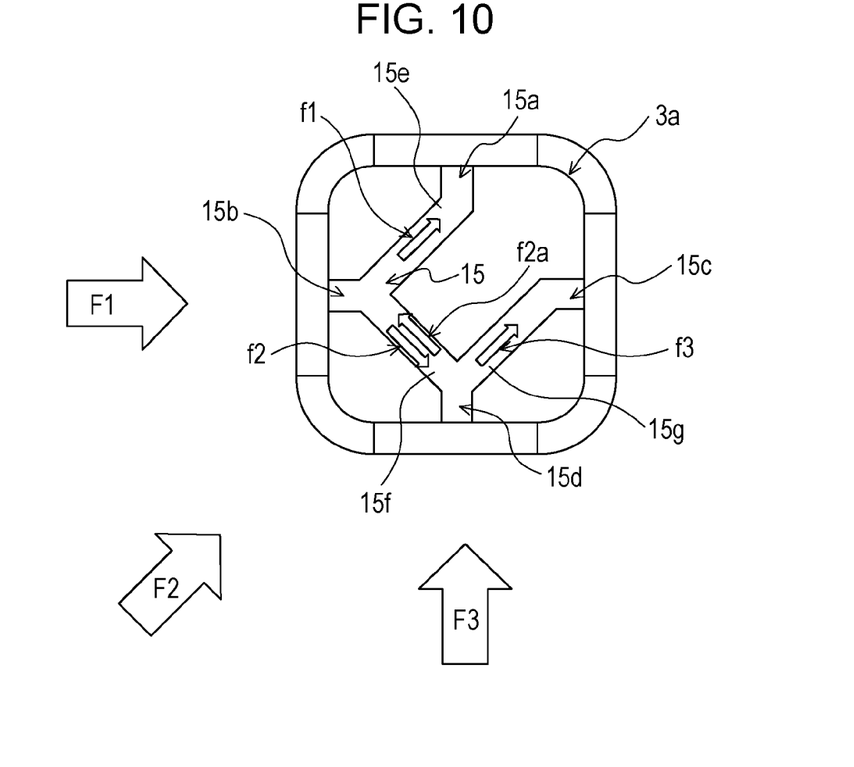
FIG. 10 is a view showing the second embodiment of the invention, and is a view for describing loads applied to the protruding portion 15 for positioning and transmission paths of the loads.

With this configuration, as shown in FIG. 10, if the force F1 is applied from the panel frame 3 to the protruding portion 15, the load of the force F1 is received by the small protrusion 15b is distributed into the two component forces f1 and f2. Similarly, if the force F3 is applied to the protruding portion 15 for positioning, the force F3 received by the small protrusion 15d is distributed into the two component forces f2a and f3. If a force F2 is applied in an intermediate direction between the directions of the forces F1 and F3, the force F2 is received by the two small protrusions 15b and 15d, and the force is transmitted to paths of f1 and f3. In contrast, since the document pressing plate 2 is normally provided, a large force is hardly applied in the direction opposite to the external force F1.

Figure 11:
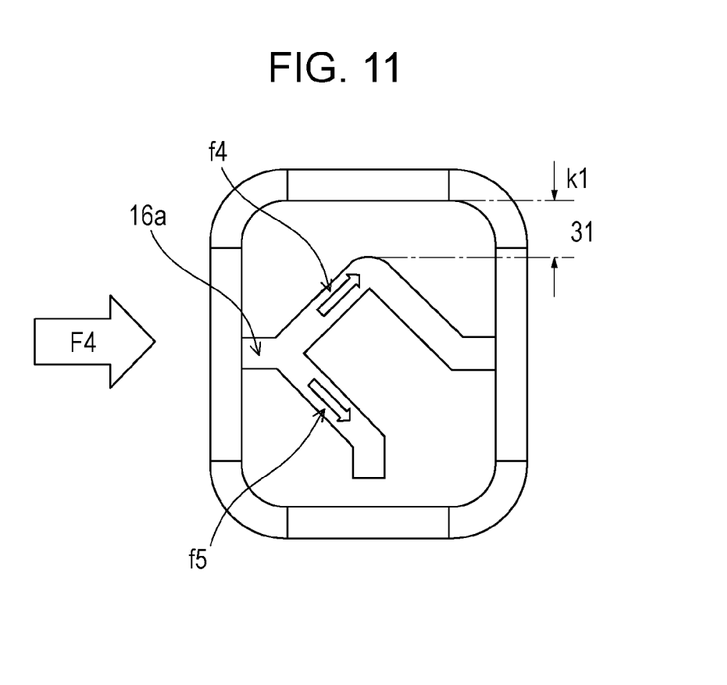
FIG. 11 is a view showing the second embodiment of the invention, and is a view for describing a load applied to the protruding portion 16 for positioning and a transmission path of the load.

Also, FIG. 11 shows a transmission path of a force when the force is applied to the protruding portion 16 for positioning. Similarly to FIG. 10, when the external force F4 is applied to the protruding portion 16 for positioning, the load received by the small protrusion 16a is distributed into two paths of f4 and f5.

In this embodiment, the length from an end of the small protrusion 15a to an end of the small protrusion 15d, and the length from an end of the small protrusion 15b to an end of the small protrusion 15c are each slightly smaller than the inside dimension of the positioning hole 3a. Also, the length from an end of the small protrusion 16a to an end of the small protrusion 16b is slightly smaller than the inside dimension of the positioning hole 3b. The backside of the small protrusions 15a is supported by only the single oblique rib 15e, and the backside of the small protrusion 15c is supported by only the single oblique rib 15g. Hence, if the material of the panel cover 1 is a flexible material, the length from the end of the small protrusion 15a to the end of the small protrusion 15d and the length from the end of the small protrusion 15b to the end of the small protrusion 15c may be each slightly larger than the positioning hole 3a. Even in this case, since the ribs 15e and 15g at the backside of the small protrusions 15a and 15b can be deformed, the panel cover 1 can be assembled. Even when the length from the end of the small protrusion 16a to the end of the small protrusion 16b is slightly larger than the positioning hole 3b, the panel cover 1 can be assembled similarly.

Also, since the protruding portions 15 and 16 for positioning have the small protrusions at the portions that contact the positioning holes 3a and 3b, the dimensional management during manufacturing can be easily performed, and the dimensional adjustment of the mold can be easily performed during manufacturing with the mold.

Third Embodiment

Figure 12:
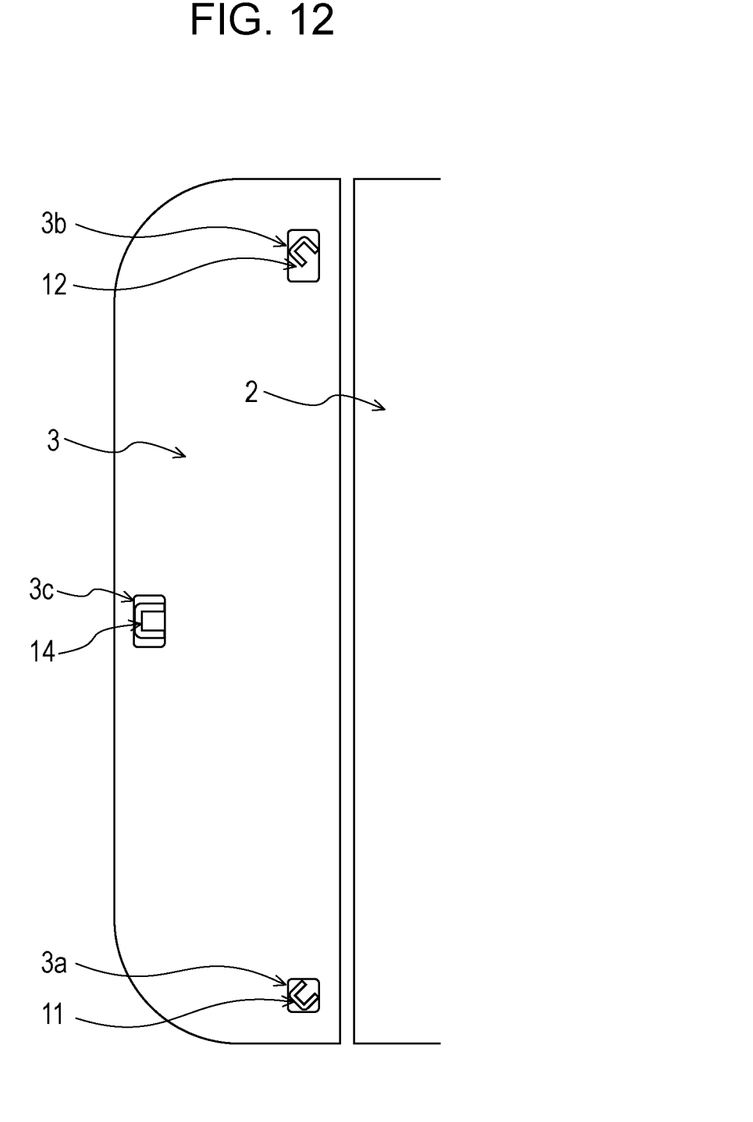
FIG. 12 is a view showing a third embodiment of the invention, and is a view for describing an arrangement of a protruding portion 14 for positioning and an orientation of a shape.

FIG. 12 is a schematic view for explaining a third embodiment of the invention. The same reference signs are applied to the same configurations as those of the first embodiment and the second embodiment in FIGS. 1 to 11. In FIG. 12, reference sign 3c is a third positioning hole provided at the panel frame 3 at an intermediate position between the positioning holes 3a and 3b near the outer cover 30, and reference sign 14 is a third protruding portion for positioning provided at the panel cover 1. The third protruding portion for positioning has mutually connected wall portions at positions corresponding to three sides of a quadrangle, similarly to the first protruding portion 11 for positioning and the second protruding portion 12 for positioning. Among the sides of the quadrangle, a side without the wall portion faces the document pressing plate 2.

With this configuration, since the distance between the two protruding portions for positioning described in the first embodiment is particularly large, the third protruding portion 14 for positioning and the positioning hole 3c are arranged at the intermediate position. Even when an external force is applied to a position between the protruding portions 11 and 12 for positioning, the external force can be received by a proper portion.

Accordingly, with the first member having the protruding portion for positioning and the second member having the recess or protrusion to which the protruding portion is fitted, even if the distance between the protruding portions for positioning is large, the stress concentration on the protruding portions for positioning can be avoided. In this embodiment, the single protruding portion for positioning is added between the first protruding portion for positioning and the second protruding portion for positioning as compared with the first embodiment. However, it is not limited thereto. Even if a plurality of the protruding portions for positioning are added between the first protruding portion for positioning and the second protruding portion for positioning, similar advantages can be obtained.

In each of the above-described embodiments, the protruding portion has the configuration that engages with the inner surface of the hole of the counterpart; however, a configuration in which the protruding portion engages with a second protruding portion of the counterpart may be employed. Further, a configuration in which the protruding portion engages with the inner side surface of the recess of the counterpart may be employed.

In each of the above-described embodiments, the protruding portion has the wall portions formed at the positions corresponding to the three sides of the quadrangle. However, it is not limited thereto. A wall portion may be provided at a position corresponding to a side of a polygonal, such as a triangle or a shape having more than four sides, in accordance with the shape and number of positioning portions. Even in this case, a plurality of wall portions are continuously formed at the positioning portion. The force received by the positioning portion may be received by the plurality of wall portions in a distributed manner.

With each of the above-described embodiments, since the protruding portion for positioning a member is formed of a rib shape, the use amount of material can be decreased. Also, when a load is received by the protruding portion for positioning, the load is received by the first receiving portion in a direction in which a particularly large load is applied. Hence, the load can be distributed into the two ribs. Even if the use amount of material is decreased, the positioning protruding portion can be prevented form being broken.

In each of the above-described embodiments, the orientation of the one side of the quadrangle without the wall portion is determined with regard to the direction in which the force is applied to the protruding portion when falling. That is, the corner portion in which the two wall portions intersect with each other is provided in the direction in which the protruding portion is strongly pressed to the receiving portion because of the external force applied when falling. The corner portion in which the wall portion is formed at only one side is provided in the direction in which the protruding portion is less likely strongly pressed to the receiving portion when falling. However, it is not limited thereto. A side of the protruding portion to which a large force is not applied during normal use, or a side of the protruding portion to which a large force is hardly applied may be the one side without the wall portion.

With the present invention, the part engaging structure having sufficient intensity while reducing the use amount of material, and having high positioning accuracy can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2013/069575, filed Jul. 19, 2013, which is hereby incorporated by reference herein in its entirety.

The invention claimed is:

1. A structure comprising:
   a first member having a first protruding portion and a second protruding portion; and
   a second member having a first receiving portion and a second receiving portion each having inner surfaces, wherein the second member engages with the first member by fitting the first protruding portion in the first receiving portion and fitting the second protruding portion in the second receiving portion, respectively, wherein each of the first and the second protruding portions includes three ribs to form an imperfect quadrangle shape having three sides and lacking one side and having four corners, and each of the three sides is not parallel to the inner surfaces, and wherein the four corners of the first protruding portion contact four inner surfaces of the first receiving portion, and opposite two corners of the second protruding portion contact two inner surfaces of the second receiving portion.

2. The structure according to claim 1, wherein each of the inner surfaces of the first and the second receiving portions includes four surfaces to form a quadrangle shape surrounding the first and the second protruding portions, respectively.

3. The structure according to claim 1, wherein the first member is manufactured by injection molding together with the first and the second protruding portions.

4. The structure according to claim 1, wherein the first member is a cover of an apparatus and each of the three ribs has a thickness being 70% or less of a basic thickness of the cover.

5. The apparatus according to claim 1, wherein the first member is a cover of an operation panel, and the second member is a frame of the operation panel.

6. A structure comprising:
a first member having a protruding portion; and
a second member having a receiving portion with inner surfaces, wherein the second member engages with the first member by fitting the protruding portion in the receiving portion,
wherein the protruding portion includes three ribs to form an imperfect quadrangle shape having three sides and lacking one side and having four corners, each of the three sides is not parallel to the inner surfaces, and at least opposite two corners of the protruding portion contact the inner surfaces for positioning.

7. The structure according to claim 6, wherein the inner surfaces include four surfaces to form a quadrangle shape surrounding the protruding portion, and the four corners of the first protruding portion contact the four surfaces.

8. The structure according to claim 6, wherein the lacking side faces in a direction so that an estimated impact force received by one of the opposite two corners formed with one rib is smaller than an estimated impact force received by the other one of the opposite two corners formed with two ribs.

9. The structure according to claim 6, wherein the first member is manufactured by injection molding together with the protruding portion.

10. The structure according to claim 6, wherein the first member is a cover of an apparatus and each of the three ribs has a thickness being 70% or less of a basic thickness of the cover.

11. The apparatus according to claim 6, wherein the first member is a cover of an operation panel, and the second member is a frame of the operation panel.

* * * * *